(12) United States Patent
Beltz et al.

(10) Patent No.: US 8,282,840 B2
(45) Date of Patent: Oct. 9, 2012

(54) METHOD OF REMOVING OIL FROM A MIXTURE OF TOOL STEEL SWARF GRANULAR MATERIAL AND OIL

(75) Inventors: Robert J. Beltz, Latrobe, PA (US); Eugene J. Greskovich, State College, PA (US)

(73) Assignee: Kalumetals, Inc., Derry, PA (US)

( * ) Notice: Subject to any disclaimer, the term of this patent is extended or adjusted under 35 U.S.C. 154(b) by 862 days.

(21) Appl. No.: 12/135,562

(22) Filed: Jun. 9, 2008

(65) Prior Publication Data

US 2010/0038312 A1 Feb. 18, 2010

Related U.S. Application Data

(60) Provisional application No. 60/942,883, filed on Jun. 8, 2007, provisional application No. 60/942,748, filed on Jun. 8, 2007, provisional application No. 60/942,759, filed on Jun. 8, 2007.

(51) Int. Cl.
*B01D 43/00* (2006.01)
*B01D 11/02* (2006.01)

(52) U.S. Cl. .................. 210/808; 210/634; 210/774

(58) Field of Classification Search .................. None
See application file for complete search history.

(56) References Cited

U.S. PATENT DOCUMENTS

| | | | | |
|---|---|---|---|---|
| 4,466,923 A | * | 8/1984 | Friedrich | 554/8 |
| 4,705,565 A | * | 11/1987 | Beltz et al. | 75/235 |
| 5,013,443 A | * | 5/1991 | Higashidate et al. | 554/184 |
| 5,135,655 A | * | 8/1992 | Cimino et al. | 210/639 |
| 5,169,968 A | | 12/1992 | Rice | |
| 5,290,959 A | | 3/1994 | Rice | |
| 6,001,245 A | * | 12/1999 | Reich et al. | 210/634 |
| 2004/0195152 A1 | * | 10/2004 | Massetti et al. | 209/11 |
| 2005/0199263 A1 | | 9/2005 | Irie et al. | |
| 2005/0257809 A1 | | 11/2005 | Fedegari et al. | |

OTHER PUBLICATIONS

Machine Shop, "Cutting fluid types and uses", available at <http://its.fvtc.edu/machshop1/coolant/cutfluids.htm>, accessed Feb. 20, 2012; available online as of Nov. 12, 2004, verified on <www.archive.org>.*
Fu et al. Recycling steel from grinding swarf. Waste Management 18 (1998) 321-329.*
Guigard et al. Treatment of oil-contaminated drill cuttings using supercritical carbon dioxide (SC CO2). CSCE/EWRI of ASDCE Environmental Engineering Conference Niagara 2002, p. 1-10.*
International Search Report PCT/US 08/66291 and English translation thereof.

* cited by examiner

*Primary Examiner* — Krishnan S Menon
*Assistant Examiner* — Katherine Zalasky
(74) *Attorney, Agent, or Firm* — Nils H. Ljungman & Associates

(57) ABSTRACT

A method of removing oil from a mixture of tool steel swarf granular material and oil. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 5 Drawing Sheets

Solubility of Oil in $CO_2$

Note: Points A and B are at EQUILIBRIUM.
Working capacity @ 9200psi -850psi
These solubilities are estimates and extrapolations.

METHOD OF REMOVING OIL FROM A MIXTURE OF TOOL STEEL SWARF GRANULAR MATERIAL AND OIL

BACKGROUND

1. Technical Field

This application relates to a method of removing oil from a mixture of tool steel swarf granular material and oil.

2. Background Information

This application relates to the process conditions in utilizing supercritical carbon dioxide ($SCCO_2$) for substantial removal of residual cutting fluids, either oils and/or water, and at least partial removal of other contaminants from industrial grindings of tool steels that may be contaminated with aqueous and/or oil-based residual contaminates. The contaminant liquid can be recycled for reuse, and the solids can be recycled or remelted in the smelting process for reuse. If the contaminants are not removed, they present an environmental hazard when they are land filled or incinerated.

Supercritical carbon dioxide is carbon dioxide that is at a temperature and a pressure greater than Tr=1 and Pr=1. (Tr is T/Tc where T is the present temperature of the supercritical carbon dioxide and Tc is the critical temperature. Pr is P/Pc where P is the present pressure of the supercritical carbon dioxide and Pc is the critical pressure.) Tc, the critical temperature for carbon dioxide ($CO_2$), is 31.1 degrees Celsius (° C.), or 304.1 degrees Kelvin (K), and Pc is 73 atmospheres (atm) or about 1073 pounds per square inch (PSI).

In more general terms, supercritical carbon dioxide refers to carbon dioxide that is in a fluid state while also being at or above both its critical temperature and pressure. Carbon dioxide usually behaves as a gas in air at standard temperature and pressure (STP) or as a solid called dry ice when frozen. If the temperature and pressure are both increased from standard temperature and pressure to be at or above the critical point for carbon dioxide, it can adopt properties midway between a gas and a liquid. More specifically, it behaves as a supercritical fluid above its critical temperature (31.1° C.) and critical pressure (73 atm), expanding to fill its container like a gas but with a density like that of a liquid. The supercritical fluid region of the phase diagram is defined as a temperature above the critical temperature (31.1° C.) to a pressure above the critical pressure (73.8 bar or 1070 PSI).

SUMMARY

At least one possible embodiment of the present application teaches a method for the removal of oil from a mixture of granular material and oil using supercritical carbon dioxide. It was found, through experimentation, that the supercritical carbon dioxide extraction of high speed steel (HSS) grinding swarf can, in at least one possible embodiment of the present application, produce a solids high speed steel product with less than 5% (by weight) cutting oil. In at least one possible embodiment, there can be as low as 0.44% (by weight) oil in the extracted solids.

A typical high speed steel swarf analysis is presented in Table A as follows:

TABLE A

| Analysis | Weight Percent |
|---|---|
| Molybdenum (Mo) | 3.75 |
| Tungsten (W) | 1.90 |
| Vanadium (V) | 0.98 |
| Chromium (Cr) | 2.75 |
| Cobalt (Co) | 0.57 |
| Phosphorus (P) | 0.040 |
| Silica ($SiO_2$) | 5.75 |
| Alumina ($Al_2O_3$) | 3.00 |
| Oil | 22.5 |
| Iron (Fe) | (Balance) |

The source of the aluminum oxide (alumina) is the grinding media. The principal source of the silicon dioxide (silica) is diatomaceous earth. This is often added for ease of filtration in trying to remove as much oil as possible from the swarf prior to land-filling.

The following represents the physical and chemical characteristics of High speed steel grinding swarf:

Solids:
High speed steel—same composition as presented in Table A
Particle sizes of swarf in Table A—median 400 mesh, or 37 micrometers (µ); particle size diameter (PSD), such as a mean diameter of the particles, from 10 micrometers to 300 micrometers; particles generally irregularly shaped and generally not spherical.

Contaminant:
A complex mixture of hydrocarbons
Mixture, mostly paraffinic, but also some high MW oxy compounds
Component analysis as follows:
  $C_6$ to $C_{10}$=~0.05% (by weight)
  $C_{10}$ to $C_{16}$=~1.06% (by weight)
  $C_{16}$ to $C_{29}$=~4.0% (by weight)
  $C_{29}$ and higher=~94.9% (by weight)
Expressed Differently the Component Analysis is as Follows:
  $H_{14}C_6$ to $H_{22}C_{10}$=~0.05% (by weight)
  $H_{22}C_{10}$ to $H_{34}C_{16}$=~1.06% (by weight)
  $H_{34}C_{16}$ to $H_{60}C_{29}$=~4.0% (by weight)
  $H_{60}C_{29}$ and higher=~94.9% (by weight).

In at least one possible embodiment of the present application, the particle sizes are primarily in the range of 10 to 100 micrometers. If a screen analysis of dried swarf is completed, at least 50% of the material by weight will pass through a standard 325 mesh screen. The screen opening for the 325 mesh screen is 45 micrometers. At least 98% of this material by weight will pass through a 80 mesh screen which has a screen opening of about 177 micrometers.

In a screen analysis of a high speed steel swarf sample, oil was removed from a mixture of granular material and oil using supercritical carbon dioxide ($CO_2$). The following Table B presents these results:

TABLE B

| U.S. mesh | Micrometers | Percent by |
|---|---|---|
| +80 | 212 | 0.7 |
| +100 | 150 | 0.7 |
| +170 | 90 | 6.9 |
| +200 | 75 | 5.2 |
| +230 | 63 | 5.2 |
| +270 | 53 | 7.2 |
| +325 | 45 | 12.4 |
| +400 | 37 | 26.2 |
| +500 | 25 | 31.5 |
| −500 | <25 | 2.1 |

In this case, the median size (based on numbers of particles) was 39 micrometers.

Concerning non-metallic swarf components, diatomaceous earth is often used in such equipment as Coopermatic Filters to filter swarf from the grinding oil in manufacturing plants of the tool maker. Another product which is used in certain tool steel drill making plants that generate swarf is the Eagle Pitcher CELETOM FW 60.

This application relates to the process configuration using supercritical carbon dioxide in order to successfully remove as much as greater than 98% (by weight) of such contaminants from the feed solids, since the reuse of such "clean solids" is predicated on a contaminant level at approximately 0.5% to 2% (by weight). Using carbon dioxide as the working fluid or extraction solvent, at least one embodiment of the present application utilizes carbon dioxide cycling in and out of the supercritical state to convert a metal waste by product into a reusable liquid contaminant and substantially liquid contaminant-free solids, both of which can be reused with relatively small waste. The carbon dioxide may also be re-circulated and reused.

It is not necessarily desirable to produce a solids product with 0% contaminant (oil) since pure metals and/or alloys with high surface areas per weight, such as high speed steel, can undergo rapid oxidation with air, especially for very high surface area fines. Not only can the temperature increases be large, there can or may be auto-ignition, such as an explosion, of certain metals or alloys. Therefore, from a process point-of-view, removal of as much contaminant as possible should be promoted or maximized, while still leaving a minimum amount sufficient to suppress spontaneous reaction during contact with air (oxygen) during the handling and transport of the purified solids.

In this regard, it is sufficient to leave approximately 0.5% to 2% (by weight) contaminant oil on high speed steel product. For other examples of metals and alloys, it may be sufficient to leave a different contaminant level, predicated by the oxidation chemistry for each specific solid material in the cleansed product.

For extracted high speed steel swarf solids product, therefore, it may be sufficient to leave 0.5 to 2% (by weight) residual contaminant for handling and storage purposes, while re-melting such solids product can be easily and safely carried out.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the present application will be described by means of the accompanying drawings, in which.

DESCRIPTION OF EMBODIMENT OR EMBODIMENTS

Figure 1:
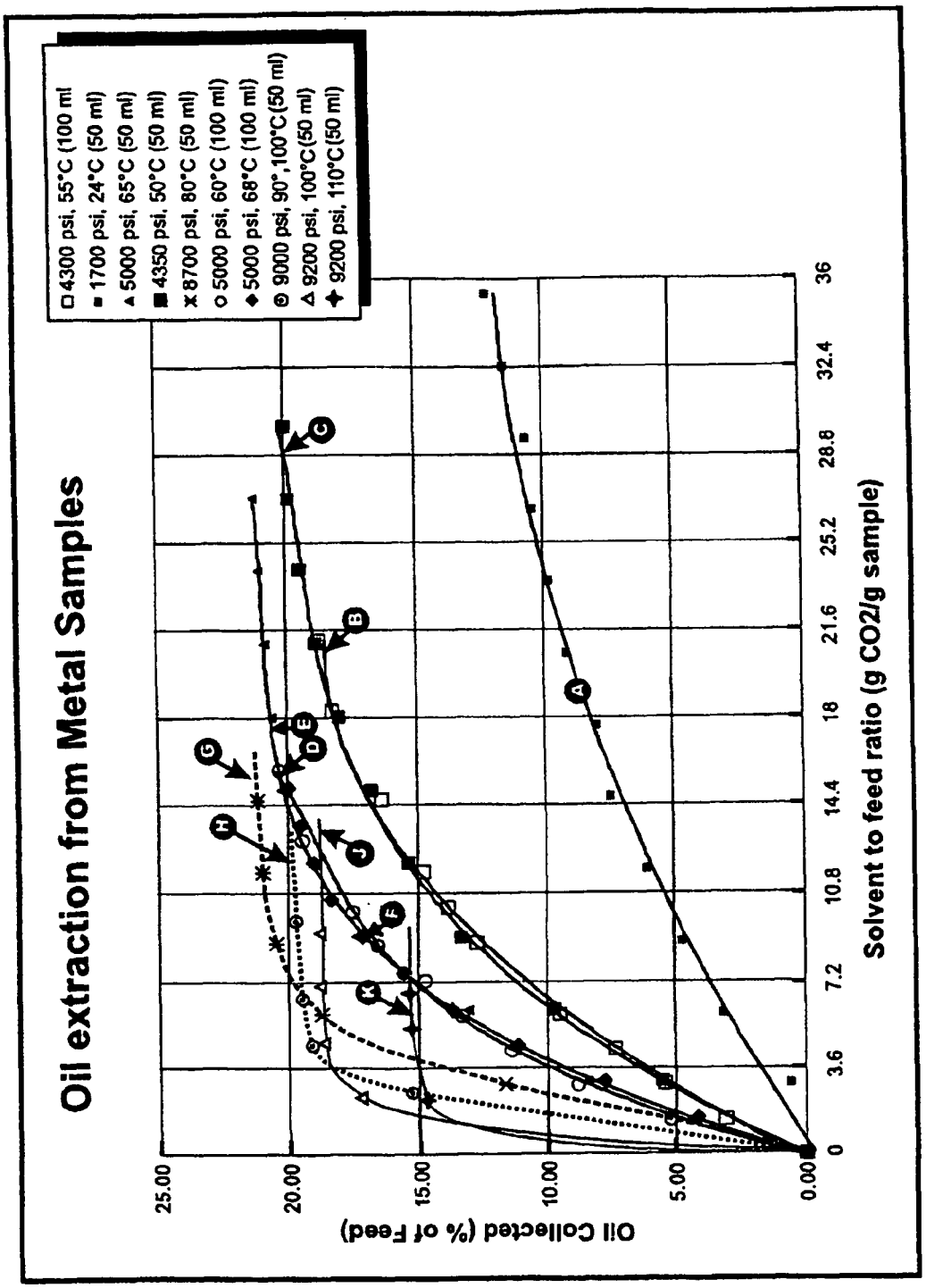
FIG. 1 is a graph showing results from supercritical carbon dioxide extraction of high speed steel grinding swarf.

The swarf, as analyzed in Tables A and B, was sent to Supercritical Solutions LLC, 2845 Rolling Green Place, Macungie, Pa., 28062, to remove oil from the mixture of granular material and oil, and Table 1 shows the resulting data. In at least one possible embodiment of the present application, a small sample of high speed steel swarf was loaded into a process development unit (PDU), brought to temperature, either by direct and/or indirect heat transfer, to 24° C., and pressurized to 1700 PSI. The sample was extracted by passing pure subcritical carbon dioxide through the bed, continuously, over a two-hour (120 min) period. The sample of initial high speed steel swarf feed contained approximately 12.4%, (by weight) contaminant oil. It should be noted that other samples of swarf could contain levels of contaminant oil other than 12.4%.

Samples of treated swarf were taken and analyzed intermittently over the duration of the experiment. The effluent carbon dioxide from the bed was depressurized, dropping-out the extracted oil in another, separate vessel. The samples were analyzed every ten minutes, and after 120 minutes, the bed was depressurized, the contents emptied, and analyzed. The following Table 1 presents these results:

TABLE I

PDU EXPERIMENTS
SCCO$_2$ EXTRACTION OF HIGH SPEED STEEL GRINDING SWARF

| Run No. | Press. (PSI) | Temp. ° C. | Residue Weight (grams) | Extracted Oil (grams) | % Oil in Feed | % Oil in Residue | Oil in Residue (grams) | Cumulative Residence Time (min) | % Oil Removed |
|---|---|---|---|---|---|---|---|---|---|
| 1 | 1700 | 24 | 26.15 | 3.69 | 12.4 | 10.6 | 2.77 | 120 | 57.1 |
| 2 | 4300 | 55 | 46.01 | 11.53 | 20.0 | 2.92 | 1.34 | 120 | 89.6 |
| 3 | 4350 | 50 | 23.38 | 6.03 | 20.5 | 2.36 | 0.55 | 120 | 91.6 |
| 4 | 5000 | 60 | 48.52 | 12.73 | 20.8 | 3.26 | 1.58 | 100 | 88.9 |
| 5 | 5000 | 64/65 | 22.39 | 6.39 | 21.9 | 1.52 | 0.34 | 80 | 94.9 |

TABLE I-continued

PDU EXPERIMENTS
SCCO$_2$ EXTRACTION OF HIGH SPEED STEEL GRINDING SWARF

| Run No. | Press. (PSI) | Temp. ° C. | Residue Weight (grams) | Extracted Oil (grams) | % Oil in Feed | % Oil in Residue | Oil in Residue (grams) | Cumulative Residence Time (min) | % Oil Removed |
|---|---|---|---|---|---|---|---|---|---|
| 6 | 8700 | 80 | 23.85 | 6.52 | 21.5 | 0.44 | 0.10 | 50 | 98.4 |
| 7 | 9000 | 90 | 25.70 | 6.20 | 19.4 | 1.02 | 0.26 | 80 | 95.9 |
| 8 | 9000 | 100 | 24.92 | 5.72 | 18.7 | 1.74 | 0.43 | 80 | 92.9 |
| 9 | 9200 | 100 | 25.54 | 5.66 | 18.1 | 1.84 | 0.47 | 85 | 92.3 |
| 10 | 9200 | 110 | 24.99 | 4.80 | 16.1 | 1.04 | 0.26 | 55 | 94.9 |
| 11 | 9200 | 110 | 25.12 | 5.98 | 19.2 | 0.93 | 0.23 | 65 | 96.2 |

In Run 1, the starting feed contained 12.4% oil, and the extracted sample of high speed steel product contained 10.6% (by weight) oil after a total processing residence time of 120 minutes. The oil removed from the feed was approximately 57.1% (by weight).

Another sample of high speed steel swarf was subjected to the process development unit and processed at supercritical carbon dioxide conditions, at 4300 PSI, and at 55 C.°, as noted in Run 2 in Table 1. The oil extracted was approximately 89.6% (by weight) at a residence time of 120 minutes.

In Run 3, the pressure was 4350 PSI, the temperature was 50° C., and the amount of feed in the PDU was approximately one half the amount in Run 2. From Table 1, it can be noted that the oil removal increased from 89.6% to 91.6% just by lowering the operating temperature 5° C., from 55 to 50° C. Again, the residence time was 120 minutes.

In Run 4, the pressure was 5000 PSI and temperature was 60° C., and the oil removal was approximately 88.9% (by weight) after a residence time of 100 minutes.

In Run 5, the temperature was 64/65° C. and a pressure of 5000 PSI was employed. Run 5 produced an oil removal of approximately 95% (by weight). The residence time was approximately 80 minutes.

Run 6 was carried out at a pressure of 8700 PSI and a temperature of 80° C. With a residence time of approximately 50 minutes, a 98.4% (by weight) removal of the contaminant oil was achieved.

The pressure was 9000 PSI at a temperature of 90° C. in Run 7. A sharp reduction in oil removal was found, down to 95.9% oil removal, and even with additional variations of pressure up to 9200 PSI and temperature up to 110° C. (Runs 8, 9, and 10), the oil removal rates appeared to take a downturn.

Runs 7 through 11 were carried out at residence times of 55-85 minutes.

For the Runs presented in Table 1, not only were the conditions of temperature and pressure closely maintained, bed size and solvent to feed ratio (gms CO$_2$/gms sample), also known as S/F, were closely controlled to obtain as high a contaminant removal as possible. In addition, residence time was carefully studied by taking samples during the Runs and analyzing the oil contents. These data are best summarized in FIG. 1.

Using a continuous process development unit (PDU), carbon dioxide at the conditions noted was passed through a bed (size noted) of high speed steel swarf and the contaminant oil removal (as % feed) was plotted against the cumulative amount of carbon dioxide being passed through the sample over the total residence time, as shown on FIG. 1. Although end-point data are tabulated in Table 1, at least 5 to 10 data points collected during the Runs were used to construct Curves A through K, as shown in FIG. 1. For clarity purposes, some are depicted in FIG. 1 to elucidate the differences. The region between 8700 PSI and 9200 PSI represents the contaminant removal, as noted in FIG. 1 for Curves G, H, and J. Note that the curve letters in FIG. 1 correspond to data points in the legend.

From the data in Table 1 and depicted in FIG. 1, it is concluded that an optimum oil removal is achieved between 8700 PSI and 9000 PSI, or indeed at 8700 PSI. At 9000 and 9200 PSI, the oil removal decreased from a maximum of 98.4% to approximately 92% to 96%.

Figure 2:
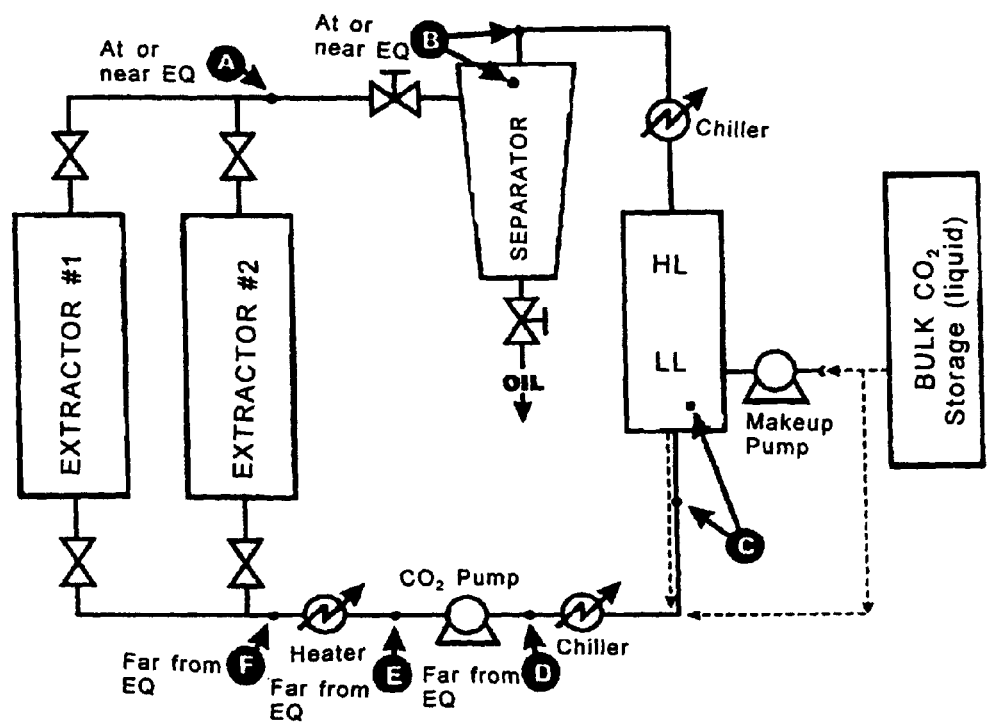
FIG. 2 is a diagram showing the process for carrying out the supercritical carbon dioxide extraction of high speed steel grinding swarf.
Figure 3:
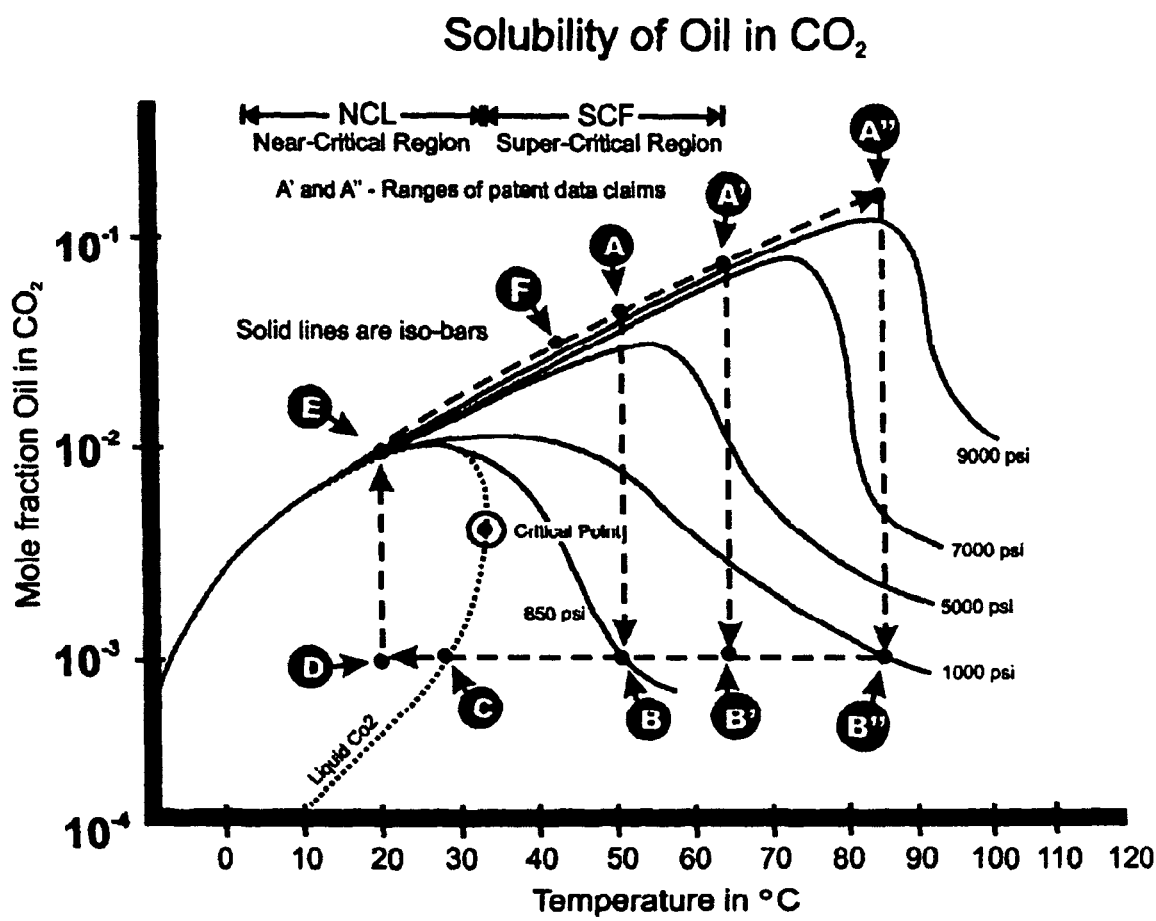
FIG. 3 is a graph showing further results from supercritical carbon dioxide extraction of high speed steel grinding swarf.

The process for carrying out the subject supercritical carbon dioxide substantial extraction of swarf can be generally depicted in FIGS. 2 and 3. FIG. 2 is a diagram depicting a process using either pure and/or recycled carbon dioxide. The pumps and heat exchangers are designed to meet target Tr and Pr conditions at the prescribed solvent carbon dioxide to feed high speed steel ratios. The size of the "feed and product beds" are dependent on the physical characteristics of the feed and the production rate desired. The number of beds can also vary (from 2 as shown in FIG. 2) depending on production rate desired.

The process depicted in FIG. 2, two parallel stages, can be designed to yield 98+% oil contaminant removal from high speed steel, and other similar metallic waste products and other similar oil contaminants at extraction and desorption pressures of between 5000 PSI and 8700 PSI, and beyond, and at temperatures between 600 and 110° C. At 5000 PSI and 65° C., a 94.9% oil removal was achieved, and at 8700 PSI and 80° C., a 98.4% oil removal was achieved (see Table 1). Therefore, it is possible 98+% oil removal could be achieved somewhere between 5000 PSI and 8700 PSI, and/or beyond. It should be understood that other process options besides two parallel stages may possibly be used in at least one possible embodiment.

FIG. 3, used in conjunction with FIG. 2, is intended to "simulate" the "cycle" for contaminant removal from high speed steel swarf. The solubility data (mole fraction oil in carbon dioxide) is estimated from the reference by J. Yau et al., J. Chem. Eng. Data, 38, 174 (1993) extrapolated to higher pressures and temperatures. The oil is assumed to be n-hexatriacontane ($C_{36}$) and its solubility in supercritical carbon dioxide used in FIG. 3 to qualitatively depict the "cycle" used in FIG. 2. Since the contaminant oil in high speed steel swarf is so complex, as will be described later, herein, most of it is $C_{29}$+. Therefore, solubility data in supercritical carbon dioxide for the highest MW normal paraffin found in the literature was used for FIG. 3.

Therefore, FIG. 3 is a solubility diagram with Points A through F depicted from FIG. 2. The only points truly at, or close to, equilibrium are Points A and B and A', A", B', and B". Points C, D, E and F are far from equilibrium, but at pressures and temperatures depicted on FIG. 3. Hence, the Points in any one cycle are represented by the Temperatures and Pressures, and additionally, for Points A, A', and A", and B, B', and B", the solubility of oil in the supercritical carbon dioxide. (All points A fall on the isobar desired, such as 4300 psi up to 9000 psi.)

Figure 4:
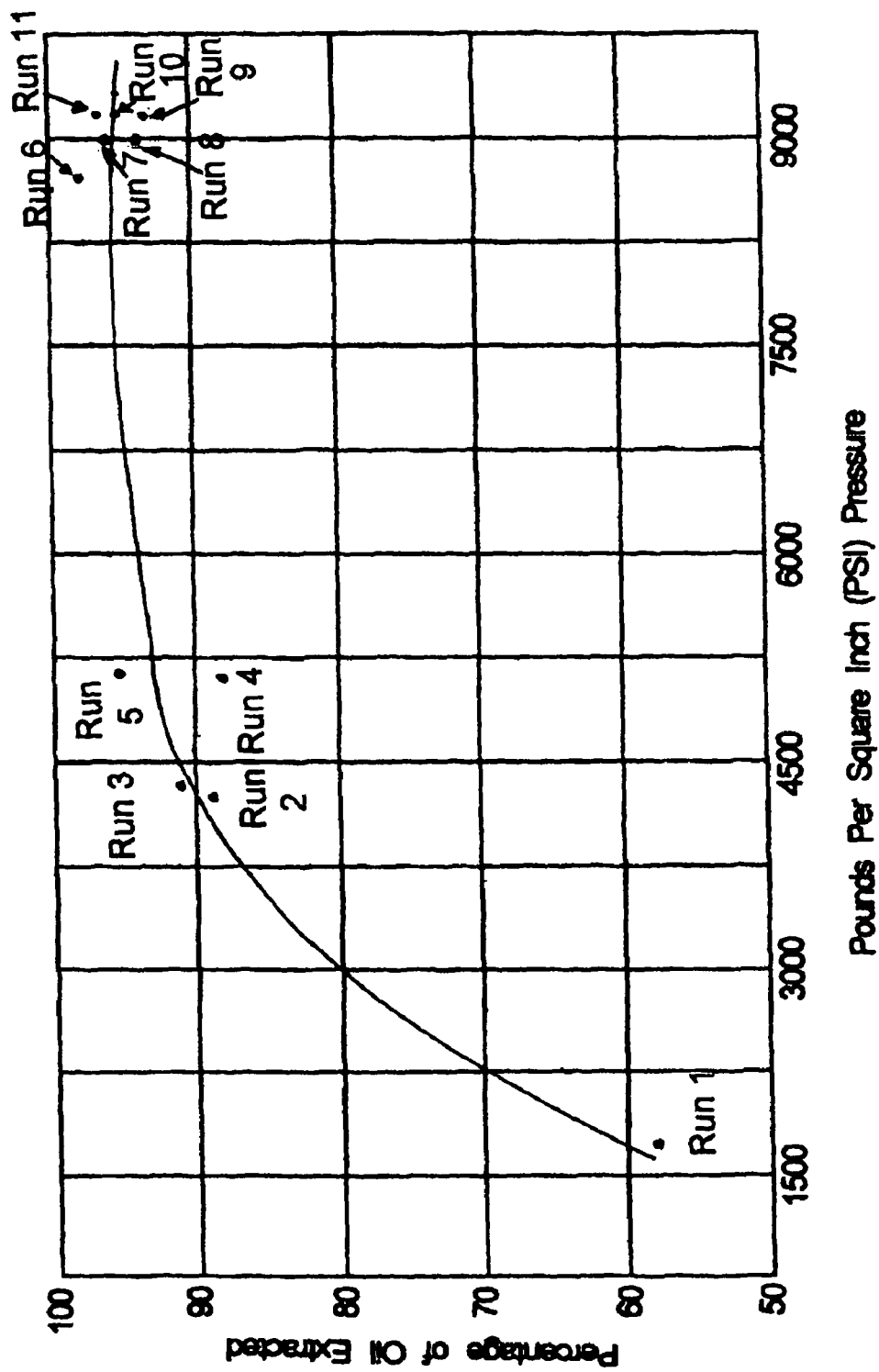
FIG. 4 is a graph showing the percentage of oil extracted during a process of supercritical carbon dioxide extraction of high speed steel grinding swarf.

FIG. 4 is a graph in which represents the percentage of oil extracted during Runs 1-11 using the indicated pounds per square inch PSI pressure, as shown in Table 1. For instance, in Run 1, 57.1% of the oil was removed using 1700 PSI. Run 2 resulted in 89.6% of the oil being removed using 4300 PSI. 91.6% of the oil was removed using 4350 PSI in Run 3. During Run 4, 88.9% of the oil was removed using 5000 PSI. Run 5 resulted in 94.9% of the oil being removed using 5000 PSI. 98.4% of the oil was removed using 8700 PSI in Run 6. In Run 7, 95.9% of the oil was removed using 9000 PSI. Run 8 resulted in 92.9% of the oil being removed using 9000 PSI. 92.3% of the oil was removed using 9200 PSI in Run 9. Run 10 resulted in 94.9% of the oil being removed in which 9200 PSI was used. Run 11 resulted in 96.2% of oil being removed using 9200 PSI.

Figure 5:
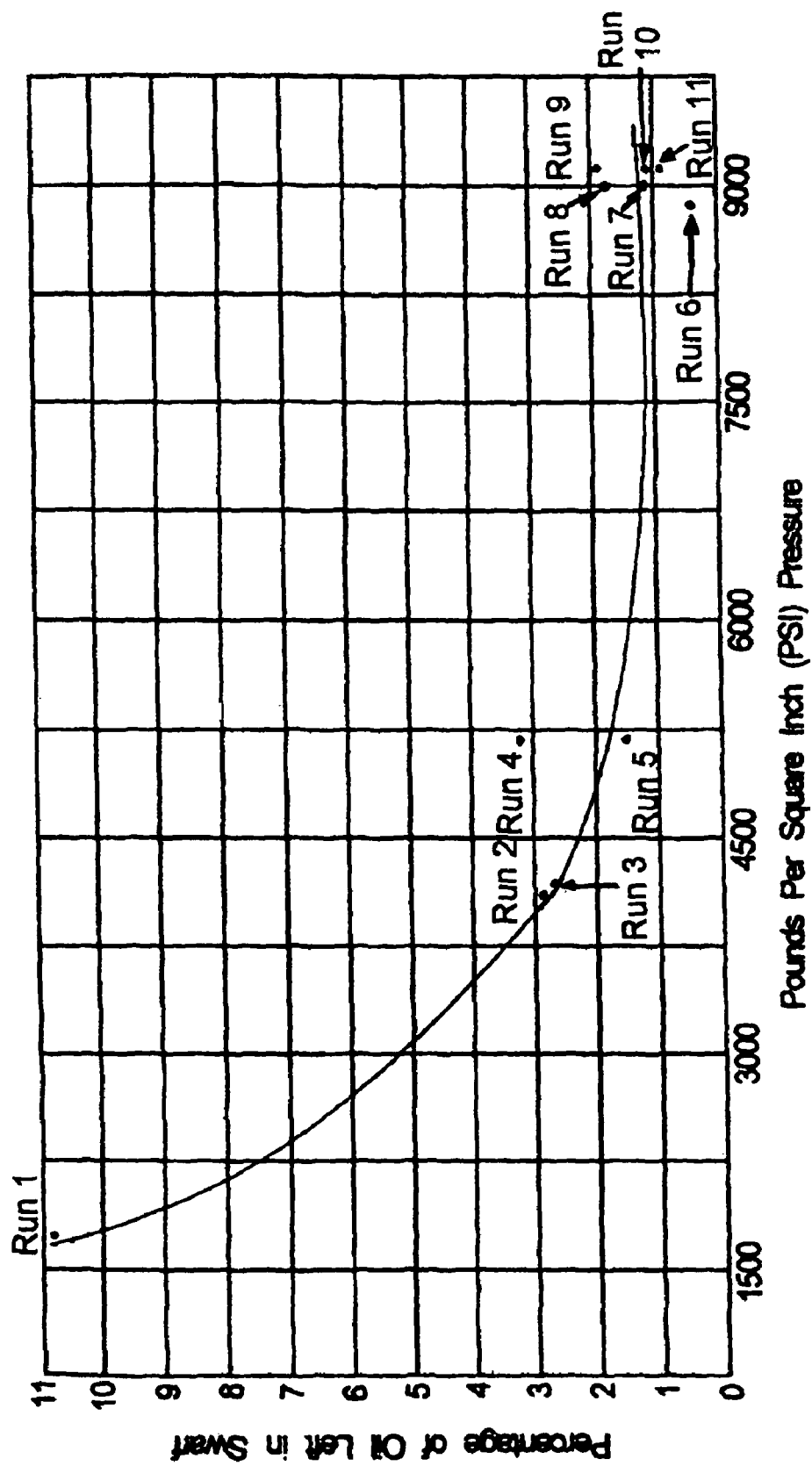
FIG. 5 is a graph showing the percentage of oil remaining after a process of supercritical carbon dioxide extraction of high speed steel grinding swarf has been completed.

FIG. 5 is a graph, using information provided in Table 1, to show the percentage of oil remaining after a process of supercritical carbon dioxide extraction of high speed steel grinding swarf has been completed. For instance, in Run 1, 10.6% of the oil remained after using 1700 PSI. Run 2 resulted in 2.92% of the oil remaining after using 4300 PSI. 91.6% of the oil remained after using 4350 PSI in Run 3. During Run 4, 3.26% of the oil remained after using 5000 PSI. Run 5 resulted in 1.52% of the oil remaining after using 5000 PSI. 0.44% of the oil remained after using 8700 PSI in Run 6. In Run 7, 1.02% of the oil remained after using 9000 PSI. Run 8 resulted in 1.74% of the oil remaining after using 9000 PSI. 1.84% of the oil remained after using 9200 PSI in Run 9. Run 10 resulted in 1.04% of the oil remaining after 9200 PSI was used. Run 11 resulted in 0.93% of oil remaining after using 9200 PSI.

Since high speed steel swarf is extremely dense (specific gravity (s.g.) of approximately 1.6), the sheer weight of the loaded process vessels at approximately 100 pounds per cubic feet can be substantial. In addition, loading, processing, and emptying such large vessels in residence times from 30 to 120 minutes can be a challenge for a large-tonnage plant. One possible option is to use a fewer number of large vessels with large weights filled and emptied in a longer period of cycle time, or another possible option is to use a larger number of smaller vessels with smaller weights filled and emptied in a shorter period of cycle time. In at least one possible embodiment, the size and cycle time for handling such feed and product materials is selected to promote the supercritical carbon dioxide deep removal of this bulk contaminant oil.

It was determined that smaller vessels, in at least one possible embodiment, with high length-to-diameter (L/D) ratios (cylindrical) would be suitable. First, high L/D ratios can be achieved, more easily, for small vessels that result in providing turbulence and good mass transport during extraction and desorption in this cyclic process. Under these conditions of both high extraction and desorption rates, the potential is high to realize high oil removal rates of 90+%, up to 98+%. Second, for smaller vessels, the volume of the vessels ($V = _{\pi}D^2L/4$) can be chosen as a function of vessel length and diameter. Once general vessel volume and shape are chosen, a minimum residence time in the vessels should be maintained at the treat rates sufficient to obtain high bulk removal efficiencies.

In this type of high-pressure gas processing, it is possible to choose a "batch-type" system or choose a "continuous-type" system. The batch systems can be used in parallel or in series, operated on a cyclic basis (at prescribed residence times), be sequentially loaded, processed, and unloaded, and yield a sufficient bulk removal efficiency. The "continuous-type" systems generally refer to a number of batch vessels, operated sequentially, with the supercritical carbon dioxide gas flow and the sequential loading, processing, and unloading of the feed and product solids can be envisioned as counter current flow of the solids movement from feed to product with respect to the flow of the supercritical carbon dioxide. The directional loading, processing, and unloading is opposite to the flow of the supercritical carbon dioxide. This type of "continuous", counter current operation is generally referred to as continuous, counter current, sequencing-batch operation. Therefore, when there are one or two batch stages, in series or parallel, the term "batch" tends to be used, and when there are three or more stages, if they operate in parallel flow to the supercritical carbon dioxide, the term "batch" is also used. However, when they operate in counter current flow of the solids to the supercritical carbon dioxide, we call them counter current "sequencing-batch" simulating counter current flows of solid feed and solid product to the flow direction of the supercritical carbon dioxide. It should be understood that "continuous" can also define a process in which the feed and solvent are fed continuously through a fixed system and the products are continuously removed.

For the conditions of Table 1, in order to achieve high contaminant removals of approximately 98%, fairly low residence times of approximately 50 minutes (as noted in Run 6 in Table 1) should be used. In at least one possible embodiment, the process can produce high oil removal levels, as well as produce an economical result. To obtain an economical result, a substantial amount of feed should be treated in a minimal time with a minimal amount of supercritical carbon dioxide (treat ratio).

It was found in this study that it was possible to operate at pressures up to 10,000 PSI and temperatures up to 80-100° C., to load, process, and unload vessels (requiring filling, pressurization, warm-up, processing, and depressurization, cool-down, and unloading) in cycle times less than 120 minutes, typically, 30 to 60 minutes; and, within 30 to 60 minutes, there was enough time to carry out the labor-related loading and unloading of approximately 200 pounds of product solids. The labor related issues may or may not involve mechanical assistance, such as robotics, if desired. Therefore, with a solids density of approximately 100 pounds per cubic foot, at least one possible reactor size would be approximately 2 cubic feet based on extracted solids. Since the feed, according to at least one possible embodiment, can be up to 50% (by weight) contaminated oil, with the added weight of the oil-laden feed solids, the extractor volume could be 2.5 cubic feet. It should also be noted that, according to at least one possible embodiment, the vessel is never or rarely totally full of feed, that is, there should be free-space in the vessels above/below the solids for equipment design and processing reasons.

In view of the above, extractor vessels may have substantial L/D's when the total volume per vessel is approximately 2.5 $ft^3$. For example, an 8-inch inner diameter vessel would be approximately 7 feet long. For this L/D, good mass transfer characteristics can be obtained for the extraction and desorption part of the cycle with nominal bed pressure drops and treat ratios, and when processing in the supercritical region, temperature and pressure control are often or sometimes critical to maintain purities.

For treat ratios of 5 to 30 gms $CO_2$/gm feed, for example, it can be calculated that sufficient mass transfer will exist in the 8-inch inner diameter vessels containing beds of solids at slightly lower volumes. That is, in at least one possible embodiment, it may be practiced to load the vessels with feed by using "baskets", which may be porous in construction, by lowering such baskets of feed into the vessel, extracting, and then raising and removing such baskets of products from the vessel. Since the baskets may contain feed up to 300 pounds, the baskets, in at least one possible embodiment, can be of metal or steel construction, or other material construction, sufficient to withstand the weight load over many repetitive loading and unloading cycles. At least a part, if not most all, of the basket should be porous to the supercritical carbon dioxide for successful extraction and possibly desorption of the contaminant oil from the bed of solids.

The number of processing vessels (stages) and the sequence of operation, co-current or counter current to the flow of supercritical carbon dioxide, should be selected for efficiency and economic reasons. For efficiency and economic reasons, counter current operations are usually or often more efficient and economical for large tonnage than co-current or batch operations for the specific separation defined and described herein. That is, the direction of filling and emptying the vessels is counter current to the flow of supercritical carbon dioxide. On this basis, the number of vessels (stages) sufficient for a prescribed treat rate is directly a function of the production rate for the entire plant. For example, if a given 8-inch by 7-foot vessel will hold approximately 300 pounds of feed and if N is the number of vessels, then 300N pound of feed can be processed at, say, a residence time of 60 minutes. Therefore, according to at least one possible embodiment, the production rate (based on the feed) can be calculated as follows: For N=4, the plant can process 1200 pounds per hour, or approximately 14.4 tons per day (T/D) of feed; and for N=3, the plant can process approximately 10.8 T/D. If the required residence time is 120 minutes, a similar calculation would show that for 3 stages, the production rate would be 5.4 T/D, and for 4 stages, the production rate would be 7.2 T/D (based on feed flow).

One feature or aspect of an embodiment is believed at the time of the filing of this patent application to possibly reside broadly in a method of removing oil from a mixture of granular material and oil, comprising high speed steel swarf, said method comprising the steps of: loading said mixture of granular material and oil into an extraction vessel; contacting said mixture with supercritical carbon dioxide at a pressure greater than 4300 PSI and at a temperature sufficient to remove a substantial portion of said oil from said mixture of granular material and oil; flowing a sufficient quantity of supercritical carbon dioxide through said mixture for a sufficient period of time to yield a reduced oil content solids product and supercritical carbon dioxide containing oil from said mixture of granular material and oil; separating said solids product from the supercritical carbon dioxide containing oil from said solids product; and removing said solids product from the extraction vessel.

The components disclosed in the various publications, disclosed or incorporated by reference herein, may possibly be used in possible embodiments of the present invention, as well as equivalents thereof.

Another feature or aspect of an embodiment is believed at the time of the filing of this patent application to possibly reside broadly in a method of removing oil from a mixture of granular material and oil, comprising high speed steel swarf, said method comprising the steps of: loading said mixture of granular material and oil into an extraction vessel; contacting said mixture with supercritical carbon dioxide at a pressure and at a temperature sufficient to remove a substantial portion of said oil from said mixture of granular material and oil; flowing a sufficient quantity of supercritical carbon dioxide through said mixture for a sufficient period of time to yield a reduced oil content solids product and supercritical carbon dioxide containing oil from said mixture of granular material and oil; separating said solids product from the supercritical carbon dioxide containing oil from said solids product; and removing said solids product from the extraction vessel.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Yet another feature or aspect of an embodiment is believed at the time of the filing of this patent application to possibly reside broadly in a method of removing oil from swarf, said method comprising the steps of: loading said swarf into an extraction vessel; contacting said swarf with supercritical carbon dioxide at a pressure greater than 4300 PSI and at a temperature sufficient to remove a substantial portion of said oil from said swarf; flowing a sufficient quantity of supercritical carbon dioxide through said swarf for a sufficient period of time to yield a reduced oil content solids product and supercritical carbon dioxide containing oil from said swarf; separating said solids product from the supercritical carbon dioxide containing oil from said solids product; and removing said solids product from the extraction vessel.

U.S. provisional patent application 60/942,883, filed on Jun. 8, 2007, having inventors Robert J. BELTZ, Eugene J. GRESKOVICH, and Rodger MARENTIS, and title "METHOD FOR DEEP EXTRACTION OF CONTAMINANTS FROM GRINDING SWARFS AND SIMILAR MATERIALS USING SUPERCRITICAL CARBON DIOXIDE" is hereby incorporated by reference as if set forth in its entirety herein.

Still another feature or aspect of an embodiment is believed at the time of the filing of this patent application to possibly reside broadly in a method of removing oil from swarf, said method comprising the steps of: loading said swarf into an extraction vessel; contacting said swarf with supercritical carbon dioxide at a pressure and at a temperature sufficient to remove a substantial portion of said oil from said swarf; flowing a sufficient quantity of supercritical carbon dioxide through said swarf for a sufficient period of time to yield a reduced oil content solids product and supercritical carbon dioxide containing oil from said swarf; separating said solids product from the supercritical carbon dioxide containing oil from said solids product; and removing said solids product from the extraction vessel.

The appended drawings in their entirety, including all dimensions, proportions and/or shapes in at least one embodiment of the invention, are accurate and are hereby included by reference into this specification.

A further feature or aspect of an embodiment is believed at the time of the filing of this patent application to possibly reside broadly in a method for separating and recycling metals and contaminant fluids from swarf comprising the steps of: a. providing a fixed bed or beds of contaminated feed particles in which the contaminant fluid is at any saturation level; b. contacting said contaminated bed with supercritical carbon dioxide (SCCO$_2$) following at treat rates of less than 30 gm CO$_2$/gm of contaminated solids; c. providing the supercritical carbon dioxide at pressures greater than 4300 PSI; d. providing sufficient contacting time and solvent to feed ratio to yield a solids product with a contaminant level less than 3.26% by weight (greater than 85% oil removal), such contacting time encompassing 120 minutes or less; e. separating the extracted contaminant by lowering the pressure (Flash) of the Supercritical carbon dioxide-contaminant extract to remove said contaminant by-product from the extract by flashing the carbon dioxide and leaving the contaminant liquid; f. selecting the pressure and temperature in the Flash to minimize oil content in the recycled carbon dioxide; g. removing the extracted solids product from the extraction vessel at or near ambient conditions; h. refilling the extraction vessel and repeating steps a) through g) as timely as desired.

U.S. provisional patent application 60/942,748, filed on Jun. 8, 2007, having inventors Robert J. BELTZ, Eugene J. GRESKOVICH, and Rodger MARENTIS, and title "DEEP EXTRACTION OF GRINDING SWARFS AND SIMILAR MATERIALS USING SUPERCRITICAL CARBON DIOXIDE" is hereby incorporated by reference as if set forth in its entirety herein.

Another feature or aspect of an embodiment is believed at the time of the filing of this patent application to possibly reside broadly in the method including at least one of (A), (B), (C), (D), (E), (F), (G), (H), (I), (J), (K), (L), (M), (N), (O), and (P), wherein (A), (B), (C), (D), (E), (F), (G), (H), (I), (J), (K), (L), (M), (N), (O), and (P) comprise the following: (A) said metal waste by-product is from tool steel swarfs; (B) said granular waste by-product is high speed steel (HSS) grinding swarf; (C) said granular waste by-product is tungsten carbide swarf; (D) the contaminant liquid is either oil-based and/or aqueous-based; (E) the supercritical carbon dioxide is maintained at a pressure level of at least 5000 PSI and a temperature of at least 60° C., to achieve greater than 88% oil removal; (F) the supercritical carbon dioxide is maintained at a pressure of at least 8700 PSI and a temperature of at least 80° C., but at a pressure less than 9200 PSI and temperature less than 110° C., to achieve greater than 98.4% oil removal; (G) the contaminant oil level in the extracted swarf product is less than 1.52% by weight; (H) the contaminant oil level in the extracted swarf product is less than 0.44% by weight; (I) less than 3.26% by weight contaminant is desired on the solid product; (J) less than 1.52% by weight contaminant is desired on the solid product; (K) less than 0.44% by weight contaminant is desired on the solid product; (L) including a cycle of pressures and temperatures where at or near equilibrium conditions are practiced in a process for containment fluid removal with supercritical carbon dioxide; (M) the contaminant fluid is a hydrocarbon or mixtures of hydrocarbons; (N) the contaminated fluid is an aqueous contaminant; and (O) the contaminant fluid is a mixture of hydrocarbons and aqueous-based components; and (P) the feed solids are any solid materials with similar particle-size ranges, yielding beds with similar porosities and mass-transfer characteristics during processing with supercritical carbon dioxide, such as tool steels and high speed steel.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Yet another feature or aspect of an embodiment is believed at the time of the filing of this patent application to possibly reside broadly in a method for treating, separating and recycling metallic solids and contaminant fluids from high speed steel (HSS) grinding swarf such that the product metals contain less than 2.4% (by weight) contaminant fluid comprising the steps of: a) providing a fixed bed (stage) of feed swarf through which supercritical carbon dioxide is passed, either up flow or down; b) maintaining a plurality of stages through which the supercritical carbon dioxide is passed counter current to the sequential operation of the stages; c) filling and emptying the stages of feed swarf and product swarf in a direction reverse of the flow of supercritical carbon dioxide; d) providing flowing supercritical carbon dioxide at treat ratio between 10 and 30 gms CO$_2$/gm feed; e) maintaining the stages at pressures greater than 4300 PSI; f) maintaining the stages at temperatures greater than 60° C.; g) removing, on a continuous basis, and separating the contaminant fluids in the supercritical carbon dioxide extract by one or more stages of pressure reduction; h) recompressing and reheating the flashed and purified carbon dioxide to the original supercritical conditions and recycling back to the stages; i) removing the separated contaminant fluid from the process; j) removing the solids product, concurrent with step g), on a semi-continuous basis for each stage, replicating a counter current movement with respect to the flowing supercritical carbon dioxide; k) removing the solids product when the oil content is less than 2.4% by weight; l) emptying, recharging, and processing each stage as described in step g) with a total cycle time less than 120 minutes for the whole process; m) maintaining N stages within the Process, predicated by the desired production rate; n) providing up to 120 minutes of residence time in the extractor to permit 98+% oil removal; o) providing up to 120 minutes of residence time for feed rates of 1 to 15 tons per day.

U.S. provisional patent application 60/942,759, filed on Jun. 8, 2007, having inventors Rodger MARENTIS, Robert J. BELTZ, and Eugene J. GRESKOVICH, and title "METHOD FOR NEARLY COMPLETE EXTRACTION OF GRINDING SWARFS AND SIMILAR MATERIALS USING SUPERCRITICAL CARBON DIOXIDE" is hereby incorporated by reference as if set forth in its entirety herein.

Still another feature or aspect of an embodiment is believed at the time of the filing of this patent application to possibly reside broadly in the method including at least one of (A), (B), (C), (D), (E), and (F), wherein (A), (B), (C), (D), (E), and (F) comprise the following: (A) said high speed steel (HSS) swarf is treated such that the product metals contain a contaminant fluid content of less than 1.5% (by weight); (B) the product metals contain a contaminant fluid content of less than 0.44% (by weight); (C) the contaminant fluid in high speed steel (HSS) grinding swarf is primarily an oil-based contaminant; (D) the contaminant fluid in high speed steel (HSS) grinding swarf is primarily an aqueous-based contaminant; (E) the contaminant fluid in high speed steel (HSS) grinding swarf is a co-mixture of aqueous and oil-based compounds; and (F) including conditions that result in a metallic product that contains as little as no (0%) contaminant, comprising the steps of: a) providing residence times in the extractor higher than 120 minutes; b) providing flowing supercritical carbon dioxide at treat ratios higher than 30 gms CO$_2$/gm feed; c) maintaining as few stages as possible, down to one stage, predicated on the production rate desired; d) optimizing steps a) through c) such that a preferred set of conditions yields a contaminant level as low as possible.

All, or substantially all, of the components and methods of the various embodiments may be used with at least one embodiment or all of the embodiments, if more than one embodiment is described herein.

A further feature or aspect of an embodiment is believed at the time of the filing of this patent application to possibly reside broadly in a method for separating and recycling metals and contaminant fluids from swarf comprising the steps of: a) providing a fixed bed or beds of contaminated feed particles in which the contaminant is at any saturation level; b) contacting said contaminated bed with supercritical carbon dioxide ($SCCO_2$) flowing at treat rates of less than 30 gms $CO_2$/gm sample; c) providing the supercritical carbon dioxide at temperatures greater than 60° C., and; d) providing the supercritical carbon dioxide at pressures greater than 4300 PSI; e) providing sufficient contacting time and solvent to feed ratio to yield a solids product with a contaminant level less than 2.4% by weight or other desired content level; f) separating the extracted oil by lowering the pressure of the supercritical carbon dioxide oil extract to remove said oil by-product from the extract; g) removing the extracted solids product from the extraction vessel at or near ambient conditions; h) refilling the extraction vessel and repeating steps a) through f) as timely as desired.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Another feature or aspect of an embodiment is believed at the time of the filing of this patent application to possibly reside broadly in the method, including at least one of (A), (B), (C), (D), (E), (F), (G), (H), and (I), wherein (A), (B), (C), (D), (E), (F), (G), (H), and (I) comprise the following: (A) said granular metal waste by-product is high speed steel (HSS) swarf; (B) the contaminant liquid is oil-based and/or aqueous-based; (C) the supercritical carbon dioxide is maintained at a pressure level of at least 5000 PSI and a temperature of at least 68° C.; (D) the supercritical carbon dioxide is maintained at a pressure of at least 8700 PSI and a temperature of at least 80° C., but at a pressure less than 9200 PSI and temperature less than 110° C.; (E) the contaminant oil level in the extracted swarf product is less than 1.5% by weight; (F) the contaminant oil level in the extracted swarf product is less than 0.45% by weight; (G) less than 2.4% by weight contaminant is desired on the solid product; (H) less than 1.5% by weight contaminant is desired on the solid product; and (I) less than 0.45% by weight contaminant is desired on the solid product.

All of the patents, patent applications and publications recited herein, and in the Declaration attached hereto, are hereby incorporated by reference as if set forth in their entirety herein.

Yet another feature or aspect of an embodiment is believed at the time of the filing of this patent application to possibly reside broadly in a method for separating and recycling metals and contaminant fluid from swarf comprising the steps of: a. Providing a fixed bed of contaminated particles in which the contaminant feed particles are placed; b. Contacting said bed of contaminated particles with supercritical carbon dioxide; c. Providing the supercritical carbon dioxide at temperatures greater than 60° C. and less than 150° C.; d. Providing the supercritical carbon dioxide at pressures greater than 5000 PSI and less than 9200 PSI; e. Providing sufficient contacting time and solvent to feed ratio to yield a solids product with a contaminant level less than 2.4 percent by weight; f. Separating the extracted oil by lowering the pressure of the supercritical carbon dioxide oil extract to remove said oil by product from the extract; g. Removing the extracted solids product from the extraction vessel at or near ambient conditions; h. Refilling the extraction vessel and repeating steps a through f as timely as desired.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Still another feature or aspect of an embodiment is believed at the time of the filing of this patent application to possibly reside broadly in the method including at least one of (A), (B), (C), (D), (E), and (F), wherein (A), (B), (C), (D), (E), and (F) comprise the following: (A) said swarf comprises high speed steel HSS swarf; (B) the contaminant liquid is oil based and/or aqueous based; (C) the supercritical carbon dioxide is maintained at a pressure level of at least 5000 PSI and a temperature of at least 68° C.; (D) the supercritical carbon dioxide is maintained at a pressure level of at least 5000 PSI and a temperature of at least 68° C.; (E) the supercritical carbon dioxide is maintained at a pressure level of at least 5000 PSI and a temperature of at least 68° C.; and wherein the contaminant oil level in the extracted swarf product is less than 1.5 percent by weight; and (H) the supercritical carbon dioxide is maintained at a pressure of at least 8700 PSI and a temperature of at least 80° C.; and wherein the contaminant oil level in the extracted swarf product is less than 0.45 percent by weight.

It will be understood that any or all examples of patents, published patent applications, and other documents which are included in this application and including those which are referred to in paragraphs which state "Some examples of . . . which may possibly be used in at least one possible embodiment of the present application . . . " may possibly not be used or useable in any one or more or any embodiments of the application.

The sentence immediately above relates to patents, published patent applications and other documents either incorporated by reference or not incorporated by reference.

A further feature or aspect of an embodiment is believed at the time of the filing of this patent application to possibly reside broadly in a method for treating and separating contaminant fluids, either oil and/or aqueous, from swarf for reuse or other industrial purposes by: (A) a method for separating and recycling metals and contaminant fluid from swarf comprising the steps of: a. Providing a fixed bed of contaminated particles in which the contaminant particles are placed; b. Contacting said bed of contaminated particles with supercritical carbon dioxide; c. Providing the supercritical carbon dioxide at temperatures greater than 60° C. and less than 150° C.; d. Providing the supercritical carbon dioxide at pressures greater than 5000 PSI and less than 9200 PSI; e. Providing sufficient contacting time and solvent to feed ratio to yield a solids product with a contaminant level less than 2.4 percent by weight; f. Separating the extracted oil by lowering the pressure of the supercritical carbon dioxide oil extract to remove said oil by product from the extract; g. Removing the extracted solids product from the extraction vessel at or near ambient conditions; h. Refilling the extraction vessel and repeating steps a through f as timely as desired, and wherein less than 2.4 percent by weight, contaminant is desired on the solid product.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Another feature or aspect of an embodiment is believed at the time of the filing of this patent application to possibly reside broadly in the method, wherein the supercritical carbon dioxide is maintained at a pressure level of at least 5000 PSI and a temperature of at least 68° C., and wherein less than 1.5 percent by weight contaminant is desired on the solid product.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Yet another feature or aspect of an embodiment is believed at the time of the filing of this patent application to possibly reside broadly in the method, wherein the supercritical carbon dioxide is maintained at a pressure level of at least 5000 PSI and a temperature of at least 68° C., and wherein less than 0.45 percent by weight contaminant is desired on the solid product.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. An industrial method of removing cutting oil from tool steel swarf in an extraction vessel, said method comprising the steps of:
    (a) opening said extraction vessel and loading said tool steel swarf into said extraction vessel;
    (b) closing said extraction vessel to seal said tool steel swarf therein;
    (c) removing a substantial portion of said cutting oil from said tool steel swarf by flowing a sufficient quantity of supercritical carbon dioxide through said tool steel swarf for a period of time sufficient to remove a substantial portion of said cutting oil from said tool steel swarf, and at a temperature sufficient to remove a substantial portion of said cutting oil from said tool steel swarf, and at a pressure of about 8700 PSI and at a temperature of about eighty degrees Celsius or greater;
    (d) separating said tool steel swarf from said supercritical carbon dioxide containing cutting oil; and
    (e) opening said extraction vessel and removing said tool steel swarf from said extraction vessel.

2. The method according to claim 1, wherein said step (c) comprises removing a substantial portion of said cutting oil from said tool steel swarf essentially solely by flowing a sufficient quantity of supercritical carbon dioxide through said tool steel swarf.

3. The method according to claim 2, wherein said extraction vessel has immovable side and end walls during a step of removal of cutting oil from tool steel swarf, and wherein said step (b) comprises closing said extraction vessel to provide immovable side and end walls during removal of cutting oil from tool steel swarf.

4. The method according to claim 3, wherein said method comprises treating 1 to 15 tons of swarf per day.

5. The method according to claim 4, wherein said method comprises one of:
    using an extraction vessel having an interior volume of 2-2.5 cubic feet; and
    using an extraction vessel having an inner diameter of about 8 inches and a length of about 7 feet.

6. The method according to claim 4, wherein:
    said step of loading swarf into said extraction vessel comprises inserting porous baskets containing 100-300 pounds of swarf into said extraction vessel and flowing supercritical carbon dioxide through said baskets; and
    said step of removing swarf from said extraction vessel comprises removing said baskets full of swarf.

7. The method according to claim 4, wherein:
said step (b) comprises contacting said swarf with said supercritical carbon dioxide at a temperature in the range of at least 80° C. to at most 110° C.;
said step (c) comprises flowing said supercritical carbon dioxide through said swarf for 120 minutes or less at a treat ratio of between 5 and 30 grams of carbon dioxide per gram of high speed steel swarf; and
said step (e) comprises removing said high speed steel swarf from said extraction vessel at or near ambient conditions,
said method further comprises the steps of:
  (f) lowering the pressure and temperature of cutting oil-laden supercritical carbon dioxide to separate said cutting oil from said cutting oil-laden supercritical carbon dioxide; and
  (g) recycling said supercritical carbon dioxide for reuse in the removal of cutting oil from swarf, either with the addition of fresh, make-up, carbon dioxide at any ratio, or without the addition of fresh, make-up, carbon dioxide at any ratio;
said method further comprises removing an aqueous liquid or a mixture of aqueous and oil liquids with said cutting oil from said tool steel swarf;
said step (f) comprises selecting a predetermined lower pressure and temperature sufficient to minimize cutting oil content in the supercritical carbon dioxide to be recycled;
said step (c) comprises flowing supercritical carbon dioxide one of: in the same direction as, transverse to, or counter to the flow of swarf, which flow of swarf is one of: a horizontal flow, a vertically upward flow, or a vertically downward flow;
said step (g) comprises recompressing and reheating the carbon dioxide to the original supercritical conditions;
said steps (a)-(g) are performed in a plurality of separate extraction vessels operating in parallel, sequentially, or in a cascade, either continuously or semi-continuously, with a cycle time of less than 120 minutes for each extraction vessel, and a total cycle time of less than 120 minutes times the number of extraction vessels for the whole process.

8. The method according to claim 1, wherein said step (c) comprises removing greater than 98% of said cutting oil and reducing the cutting oil level in said swarf to less than 0.44% by weight.

9. An industrial method of removing cutting oil from tool steel swarf in an extraction vessel, said method comprising the steps of:
  (a) opening said extraction vessel and loading said tool steel swarf into said extraction vessel;
  (b) closing said extraction vessel to seal said tool steel swarf therein;
  (c) removing a substantial portion of said cutting oil from said tool steel swarf essentially solely by flowing a sufficient quantity of supercritical carbon dioxide through said tool steel swarf for a period of time sufficient to remove a substantial portion of said cutting oil from said tool steel swarf, and at a pressure of about 8700 PSI and at a temperature of about eighty degrees Celsius or greater sufficient to remove a substantial portion of said cutting oil from said tool steel swarf;
  (d) separating said tool steel swarf from said supercritical carbon dioxide containing cutting oil; and
  (e) opening said extraction vessel and removing said tool steel swarf from said extraction vessel.

10. The method according to claim 9, wherein said extraction vessel has immovable side and end walls during a step of removal of cutting oil from tool steel swarf, and wherein said step (b) comprises closing said extraction vessel to provide immovable side and end walls during removal of cutting oil from tool steel swarf.

11. The method according to claim 10, wherein said method comprises treating at least one ton of swarf per day.

12. The method according to claim 11, wherein said method comprises one of:
using an extraction vessel having an interior volume of 2-2.5 cubic feet; and
using an extraction vessel having an inner diameter of about 8 inches and a length of about 7 feet.

13. The method according to claim 11, wherein:
said step of loading swarf into said extraction vessel comprises inserting porous baskets of swarf into said extraction vessel and flowing supercritical carbon dioxide through said baskets; and
said step of removing swarf from said extraction vessel comprises removing said baskets full of swarf.

14. The method according to claim 11, wherein:
said method further comprises removing cutting oil from high speed steel swarf;
said step (c) comprises contacting said high speed steel swarf with said supercritical carbon dioxide;
said step (c) comprises flowing said supercritical carbon dioxide through said high speed steel swarf for 120 minutes or less at a treat ratio of between 5 and 30 grams of carbon dioxide per gram of high speed steel swarf;
said step (e) comprises removing said high speed steel swarf from said extraction vessel at or near ambient conditions;
said method further comprises the steps of:
  (f) lowering the pressure and temperature of cutting oil-laden supercritical carbon dioxide to separate said cutting oil from said cutting oil-laden supercritical carbon dioxide; and
  (g) recycling said supercritical carbon dioxide for reuse in the removal of cutting oil from high speed steel swarf, either with the addition of fresh, make-up, carbon dioxide at any ratio, or without the addition of fresh, make-up, carbon dioxide at any ratio;
said method further comprises removing an aqueous liquid or a mixture of aqueous and oil liquids with said cutting oil from said high speed steel swarf;
said step (f) comprises selecting a predetermined lower pressure and temperature sufficient to minimize cutting oil content in the supercritical carbon dioxide to be recycled;
said step (c) comprises flowing supercritical carbon dioxide one of: in the same direction as, transverse to, or counter to the flow of high speed steel swarf, which flow of high speed steel swarf is one of: a horizontal flow, a vertically upward flow, or a vertically downward flow;
said step (c) comprises flowing said supercritical carbon dioxide through said high speed steel swarf at a treat ratio of between 10 and 30 grams of carbon dioxide per gram of high speed steel swarf;
said step (g) comprises recompressing and reheating the carbon dioxide to the original supercritical conditions;
said steps (a)-(g) are performed in a plurality of separate extraction vessels operating in parallel, sequentially, or in a cascade, either continuously or semi-continuously, with a cycle time of less than 120 minutes for each extraction vessel, and a total cycle time of less than 120 minutes times the number of extraction vessels for the whole process; and said method further comprises providing up to 120 minutes of residence time per vessel for feed rates of 1 to 15 tons per day.

15. An industrial method of removing cutting oil from tool steel swarf in an extraction vessel having immovable side and end walls during a step of removal of cutting oil from tool steel swarf, said method comprising the steps of:
  (a) opening said extraction vessel and loading at least 100 pounds of said tool steel swarf into said extraction vessel;
  (b) closing said extraction vessel to provide immovable side and end walls during a step of removal of cutting oil from tool steel swarf and to seal said tool steel swarf therein;
  (c) removing a substantial portion of said cutting oil from said tool steel swarf by flowing a sufficient quantity of supercritical carbon dioxide through said tool steel swarf for a period of time sufficient to remove a substantial portion of said cutting oil from said tool steel swarf, and at a pressure of about 8700 PSI and at a temperature of about eighty degrees Celsius or greater sufficient to remove a substantial portion of said cutting oil from said tool steel swarf;
  (d) separating said tool steel swarf from said supercritical carbon dioxide containing cutting oil; and
  (e) opening said extraction vessel and removing said tool steel swarf from said extraction vessel.

16. The method according to claim 15, wherein said method comprises:
  removing cutting oil from high speed steel swarf; and
  treating 1 to 15 tons of swarf per day.

17. The method according to claim 16, wherein said method comprises using an extraction vessel having an inner diameter of about 8 inches and a length of about 7 feet.

18. The method according to claim 16, wherein said method comprises using an extraction vessel having an interior volume of 2-2.5 cubic feet.

19. The method according to claim 16, wherein:
  said step of loading swarf into said extraction vessel comprises inserting porous baskets of swarf into said extraction vessel and flowing supercritical carbon dioxide through said baskets; and
  said step of removing swarf from said extraction vessel comprises removing said baskets full of swarf.

20. The method according to claim 16, wherein said step (c) comprises removing greater than 88% of said cutting oil and reducing the cutting oil level in said swarf to less than 3.26% by weight.

* * * * *